United States Patent [19]

Sugauchi et al.

[11] Patent Number: 6,041,349
[45] Date of Patent: Mar. 21, 2000

[54] SYSTEM MANAGEMENT/NETWORK CORRESPONDENCE DISPLAY METHOD AND SYSTEM THEREFOR

[75] Inventors: Kiminori Sugauchi, Yokohama; Toshiaki Hirata, Kashiwa; Kenya Nishiki, Fujisawa; Satoshi Miyazaki, Yamato; Keizo Mizuguchi, Naka-gun; Shuji Fujino, Ebina, all of Japan

[73] Assignee: Hitachi, Ltd., Tokyo, Japan

[21] Appl. No.: 08/808,916

[22] Filed: Feb. 28, 1997

[30] Foreign Application Priority Data

Feb. 29, 1996  [JP]  Japan ................................ 8-042454

[51] Int. Cl.[7] .................................................. G06F 13/00
[52] U.S. Cl. ........................... 709/223; 709/218; 709/224
[58] Field of Search ........................ 395/200.53, 200.48, 395/200.52, 200.54, 200.55, 200.68; 709/218, 222, 223, 224, 225, 238; 707/10

[56] References Cited

U.S. PATENT DOCUMENTS 5,261,044  11/1993  Dev et al. ................................ 395/159
5,796,951  8/1998  Hamner et al. ........................ 709/223

OTHER PUBLICATIONS

NEC Technology, vol. 48, No. 12; pp. 35–41 (1995).

*Primary Examiner*—Zarni Maung
*Assistant Examiner*—Jason D. Cardone
*Attorney, Agent, or Firm*—Kenyon & Kenyon

[57] ABSTRACT

An identifier of each management module is obtained on the basis of management information commonly handled by network management information and administration management information, and management information of the two is collected on the basis of the identifier, and a client/server configuration map is generated, and a network map corresponding to the map is displayed from the display element of the generated configuration map on the basis of the correspondence of the two, and the client/server configuration is displayed in relation to the network map, and an administrative role and a related object node can be identified easily.

12 Claims, 20 Drawing Sheets

106 NETWORK TO BE MANAGED

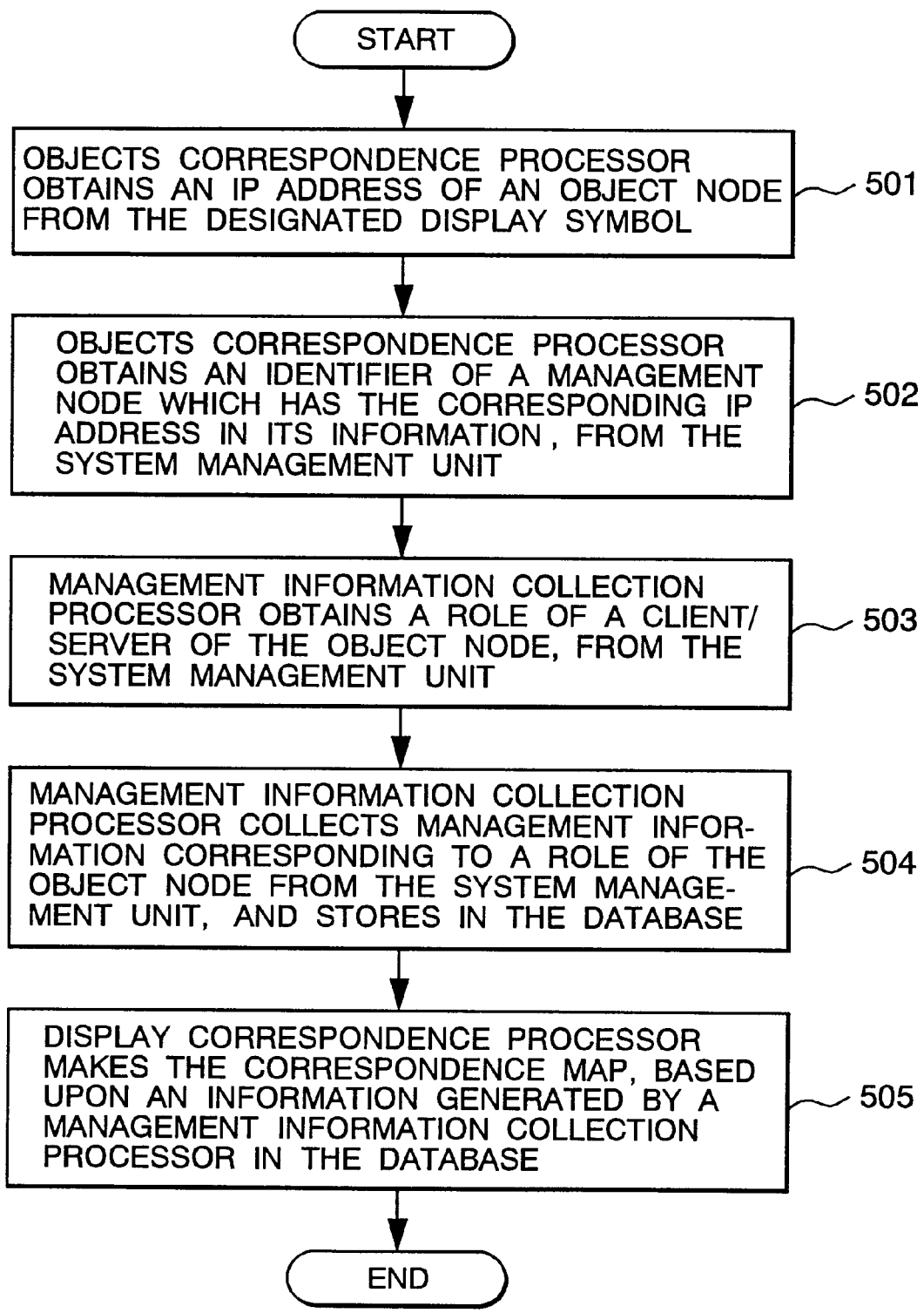

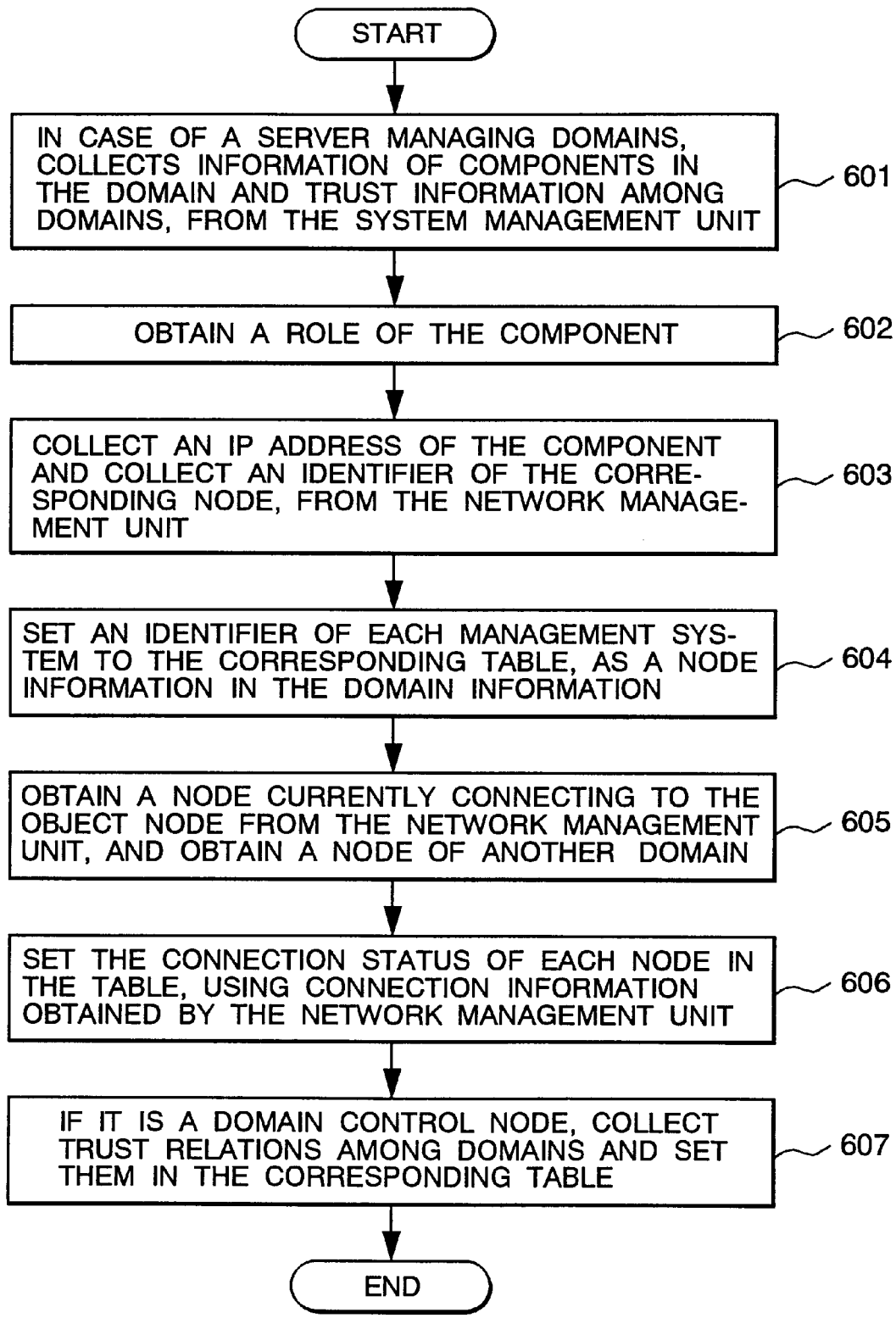

FIG. 7

| | | | | | |
|---|---|---|---|---|---|
| CORRESPONDING DOMAIN NAME | DOMAIN A | | | | |
| RELATED DOMAIN | DOMAIN B | | | | |
| NODE INFORMATION | NAME 706 | ROLE 707 | NETWORK MANAGEMENT IDENTIFIER 708 | SYSTEM MANAGEMENT IDENTIFIER 709 | CONNECTION STATE 710 |
| DESIGNATED OBJECT | Host A | SERVER | xx.yy.zz.xy | x1 | ------ |
| DOMAIN CONTROL NODE | Host A | SERVER | xx.yy.zz.xz | x2 | ------ |
| ELEMENT CONSTITUTING THE DOMAIN | Host B | CLIENT | xx.yy.zz.yz | x3 | CONNECTED |
| | Host C | CLIENT | xx.yy.zz.ab | x4 | CONNECTED |
| | Host D | CLIENT | xx.yy.zz.ac | x6 | NOT CONNECTED |
| A NODE OF ANOTHER DOMAIN | NAME | ROLE | NETWORK MANAGEMENT IDENTIFIER | SYSTEM MANAGEMENT IDENTIFIER | DOMAIN NAME 713 |
| | Host E | CLIENT | xx.yy.aa.bb | x7 | DOMAIN C |

701

702, 711, 703, 704, 705, 712

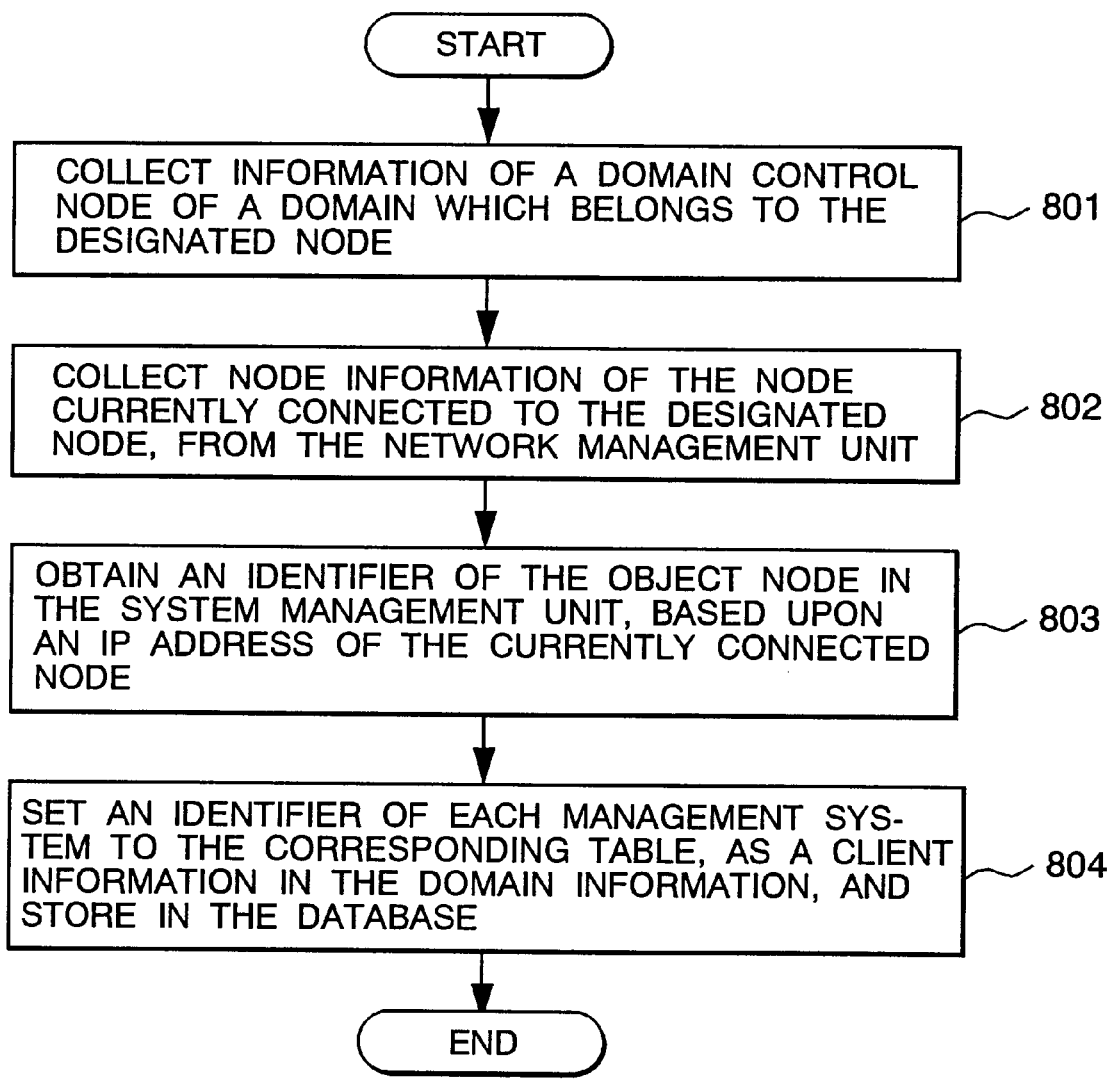

FIG. 16

| ATTRIBUTE | VALUE |
|---|---|
| 1602 — TABLE IDENTIFIER | PC01002EXT |
| 1603 — OBJECT NODE | PC01002 |
| 1604 — DOMAIN NAME | Domain A |
| 1605 — ROLE IN THE DOMAIN | DOMAIN MANAGEMENT NODE |
| 1606 — IDENTIFIER OF THE NODE CORRESPONDING TO THE NETWORK MANAGEMENT | PC01002 |
| 1607 — IDENTIFIER OF THE NODE CORRESPONDING TO THE SYSTEM MANAGEMENT UNIT | System Managor A |

| ATTRIBUTE | VALUE |
|---|---|
| 1702 — TABLE IDENTIFIER | Domain A |
| 1703 — DOMAIN NAME | Domain A |
| 1704 — DOMAIN CONTROL NODE | PC01001 |
| 1705 — RELATED DOMAIN LIST | Domain B, Domain C, Domain E |

1701

SYSTEM MANAGEMENT/NETWORK CORRESPONDENCE DISPLAY METHOD AND SYSTEM THEREFOR

BACKGROUND OF THE INVENTION

1. Field of the Invention

The present invention relates to a display method of a management system for managing a computer network including various client/server configurations and a system therefor.

2. Description of the Prior Art

With respect to management of a conventional computer network, the management functions on the basis of the network operation such as the network management for managing network devices such as a hub and a router constituting the network and the system management for managing the property and individual performance information in a computer such as a personal computer are executed independently.

A system which provides individual management functions based on a map of network management and manages these management functions on the same device in an integrated manner is described in NEC Technology, Vol. 48, No. 12, p. 35–41 (1995).

Furthermore, Dev, et al. indicate change of view of a different map as change from graphical view to topological view in U.S. Pat. No. 5,261,044 (Nov. 9, 1993).

However, the aforementioned proposed arts only display system management information corresponding to individual display symbols based on a network management map, so that a point that which components have a client/server configuration and are connected to which server can be judged easily is not taken into account.

Furthermore, in U.S. Pat. No. 5,261,044, how to generate the correspondence among display elements in two different view maps is not made clear.

SUMMARY OF THE INVENTION

An object of the present invention is to provide different maps related to each other by collecting such a client/server configuration, generating a client/server configuration map of components of a network map, automatically making correspondence with the display elements in the generated map to the display elements in the network map, and displaying them to an operator to a user.

To accomplish the above object, the present invention relates to a system management/network correspondence display method and a system thereof in a management system for managing a computer network having a client/server configuration using a plurality of computers and is characterized in that the present invention displays a network management map for managing the computer network, designates a managed object on the network management map, collects an identifier of the managed object on the basis of the management information which is commonly managed by the network management based on the network management map and the system management module including the client/server configuration, collects an operational role configuration of the designated object on the basis of the identifier, and displays the client/server configuration to which the designated object relates by at least one display symbol on the basis of the role configuration.

Furthermore, the present invention relates to a system management/network correspondence display method and a system therefor in a management system for managing a computer network of a client/server configuration using a plurality of computers, obtains management nodes within the network management range, collects client/server configuration information for each node within the network management range, generates a system map in units of client/server configuration comprising all nodes within the management range, obtains the correspondence among the display symbols of the system map and the network management map for managing the network, and obtains a client/server configuration map on the basis of the display symbols on the network management map and the obtained correspondence.

Namely, the present invention is characterized in that the present invention has a means for collecting configuration information from an administrative point from the system management information, a means for designating a component of the network, a means for filtering the client/server information of the designated component and another server relating to the server or another client from the configuration information, and a means for displaying the collected server and client system centering on the designated configuration component using a graphical user interface.

Furthermore, as different realization means by the present invention, the present invention has a means for collecting objects to be managed which are managed by the network management function on the basis of the information of the network management function, a means for making correspondence of the objects to be managed to the identifiers of the system management function, a means for collecting information relating to the client/server configuration in the system management function, and a means for generating a surveillance map showing the client/server configuration from the collected informations and a domain map representing information among the domains, so that the present invention is characterized in that a map of the client/server configuration is generated and furthermore, from a correspondence table generated from information collected from the system management and network management, the client/server configuration map and the network map can be related to each other.

The foregoing and other objects, advantages, manner of operation and novel features of the present invention will be understood from the following detailed description when read in connection with the accompanying drawings.

BRIEF DESCRIPTION OF THE DRAWINGS

FIG. 5 is a flow chart showing the outline of a process of obtaining a relating range to be managed from a designated object and displaying it.

FIG. 6 is a flow chart showing the outline of a management information collection process for collecting configuration information for a relating managed object when the designated object is a server.

FIG. 7 shows a form of a table for storing domain information relating to a designated object and collected in the present invention.

FIG. 8 is a flow chart showing the outline of a management information collection process for collecting configuration information for a relating managed object when the designated object is a client.

FIG. 16 shows a table showing a form of a correspondence table for corresponding the configuration management information to the network management information.

FIG. 17 shows a table showing a form of a domain information table for storing information in units of domain.

DETAILED DESCRIPTION OF THE PREFERRED EMBODIMENTS

Embodiment 1

An embodiment of the present invention will be explained hereunder.

Figure 1:
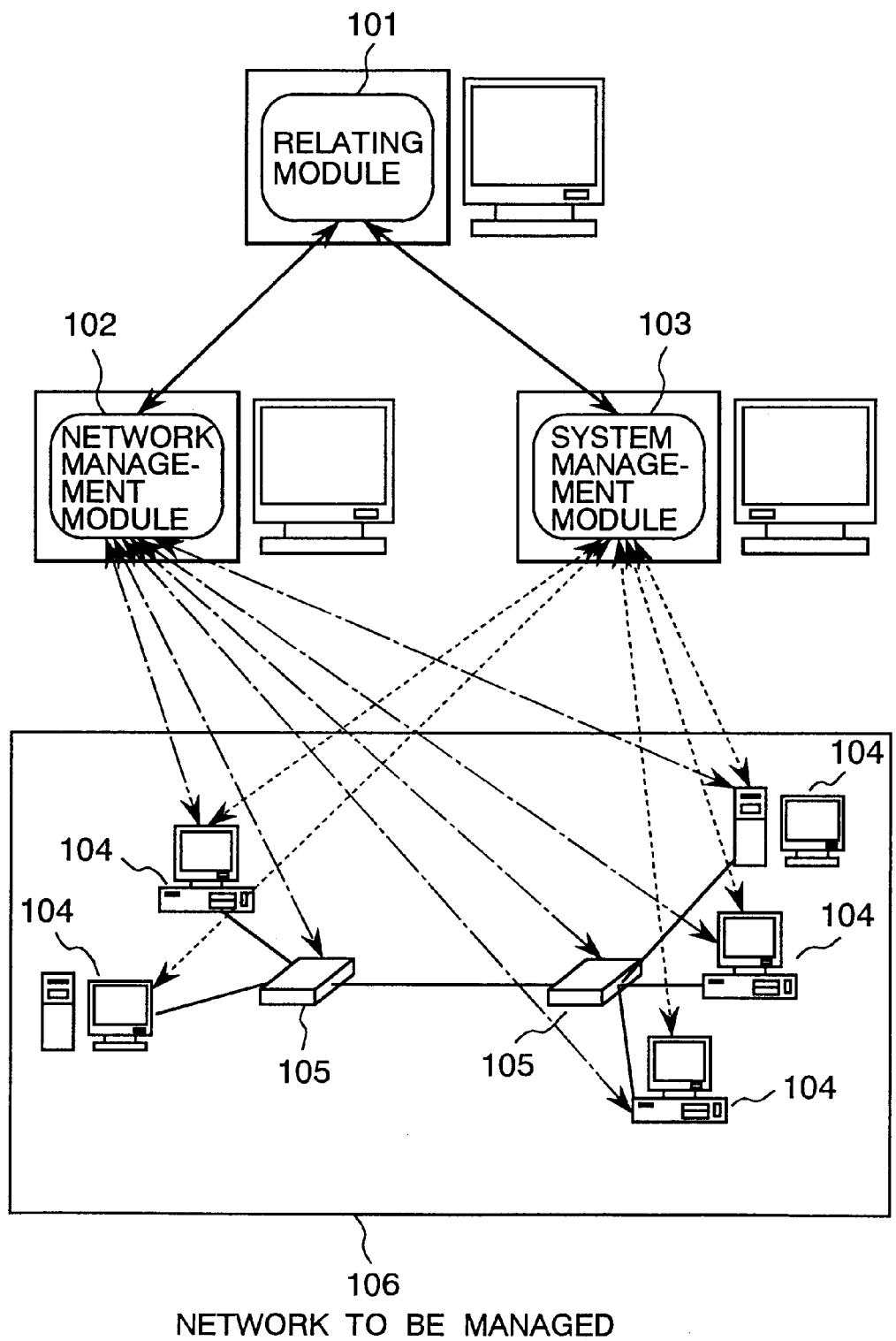
FIG. 1 shows an embodiment showing the configuration of the management system of the present invention.

FIG. 1 is a block diagram showing an embodiment of the administrative and management configuration of a network including the network/system management relating system of the present invention. Each personal computer (104) which is a component of the network uses the TCP/IP (transmission control protocol/Internet protocol) as a communication protocol and communicates with other personal computers. Communication among any personal computers is composed of a peer to peer relation that each other is treated on a footing of equality and a client/server relation that one side is assigned to a role of server and the other side is assigned to a role of client. However, the client/server configuration is decided basically as a base basically and a block composed of client/server can be defined as a domain. The component in the domain has login management to the domain and a relation among the domains centering on the server. For example, Windows NT (Windows NT is a trademark of Microsoft Corporation in USA) of Microsoft, Ltd. manages the user account to the component in a domain by one server, establishes a trust relation that the account is shared by a domain and another domain, and can access the server in the other domain by the account in the domain. In a system having such a client/server configuration as a base, a network management system (102) for managing a network has logical or physical configuration information of each component (105, 104) of a network (106) and management information such as the type of a network device to be managed using an SNMP (simple network management protocol), and operates and manages the network. The system management system (103) has the role of server/client of the personal computer (104) existing in the network and configuration information such as the internal configuration of the personal computer and the software configuration and operates, and manages the software and hardware configurations of the personal computer and terminal. A relating function system (101) collects management information of the network management system (102) and a system management system (103). The relating function system 101 collects management information in the components comprising the network when necessary. In these systems, the respective functions may be installed in the same device. For example, as shown in FIG. 2, it is considered that the network management system (102) and the relating function system (101) are installed in the same device.

Figure 2:
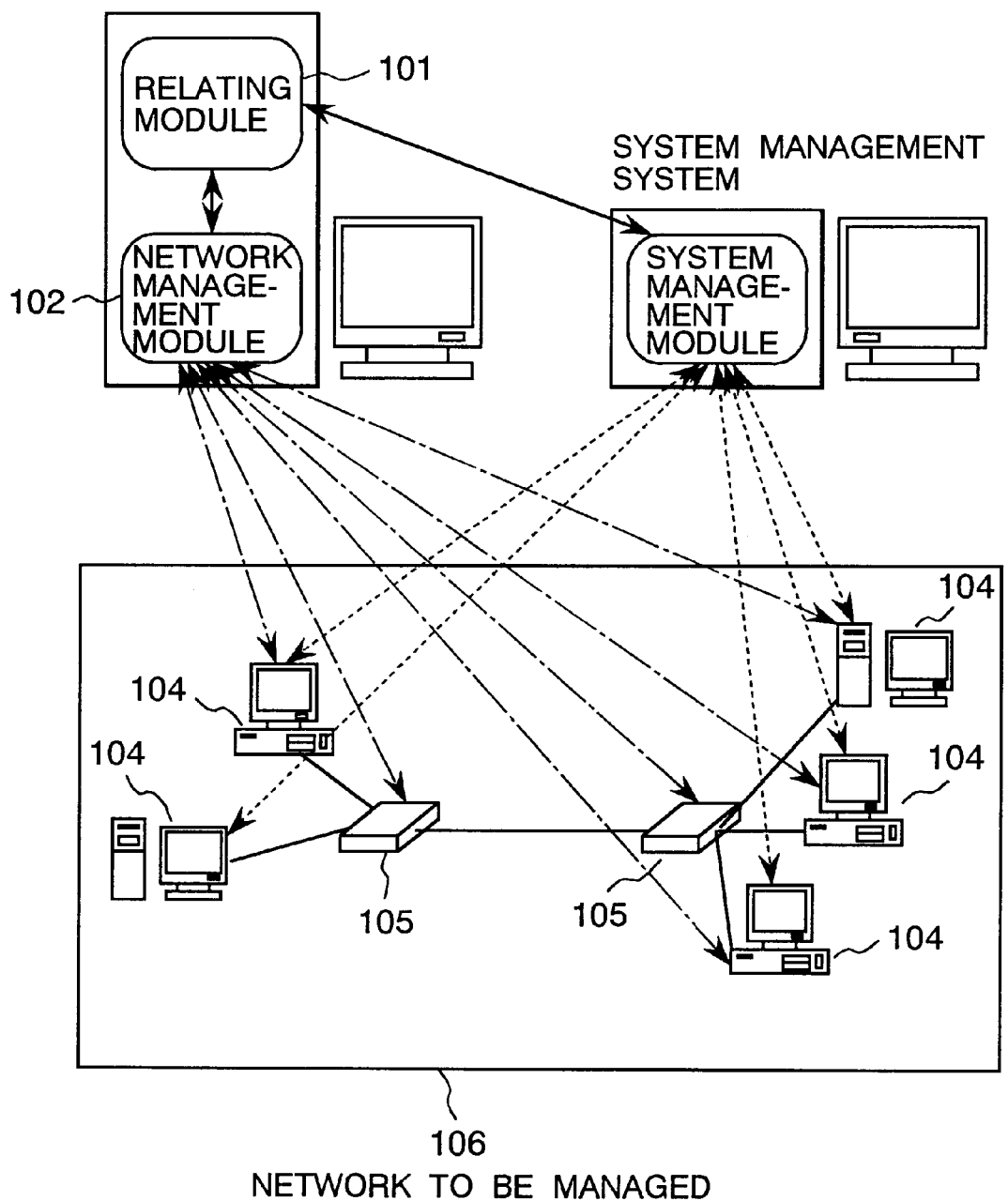
FIG. 2 shows an embodiment showing the system configuration of the present invention when the network management function and relating function are installed on one node.
Figure 3:
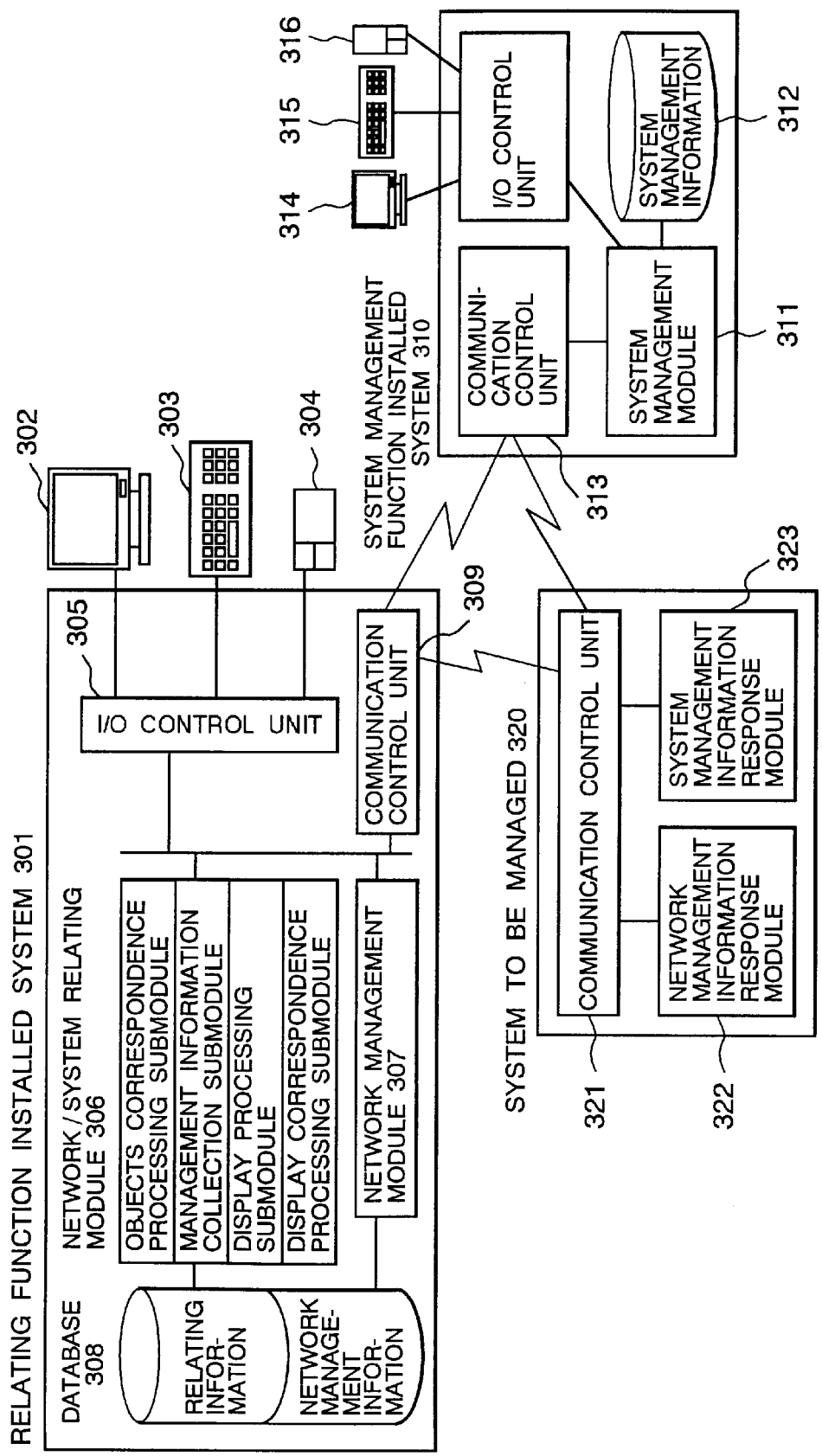
FIG. 3 is a block diagram showing the implementing structure of each management function for realizing the present invention.

FIG. 3 is a drawing showing the internal configuration of the network/system management relating function and the internal configuration of a relating system of the present invention in the system configuration shown in FIG. 2. A relating function installed system (301) has a display (302) as an output device and a keyboard (303) and a mouse (304) as an input device, provides a monitor screen to a user, and operates a managed object using them. An I/O control unit (305) controls these input and output devices and transfers input data by the input device and output data to the output device. In the relating function installed system, there exists a relating module (306) for visually relating the network management and system management on the basis of the present invention to each other and a network management module (307) for collecting and processing management information from the managed object of the network device. Management information used by these functions is reserved in the database as respective relating informations and network management information. A communication control unit (309) controls the communication process for collecting management information by each management function, transmits request information from the network management module and the relating module, and receive response and notification information from the system management module and managed object to each module. A system management function installed system (310) has a system management module (311) for collecting and processing system information on the managed object. The system management module stores collected and processed information in a database (312). The system management module can output information on system management to an output device (314) such as a display via the output control unit and collect a user request from an input device (315). Furthermore, the system management module can output system management information in response to a request from a remote system via the network. A communication control unit (313) in the system management function installed system receives a response from the managed object or a management information collection request from a remote system, notifies it to the system management module, and transmits a request or response information from the system management module. A system to be managed (320) has a function (321, 322) for responding management information to a request for the network management module or the system management module and sends or receives those informations via a communication control unit (323).

Next, the relation of the display screens of the network component and the system management component will be explained by referring to FIGS. 1 to 11.

Figure 4:
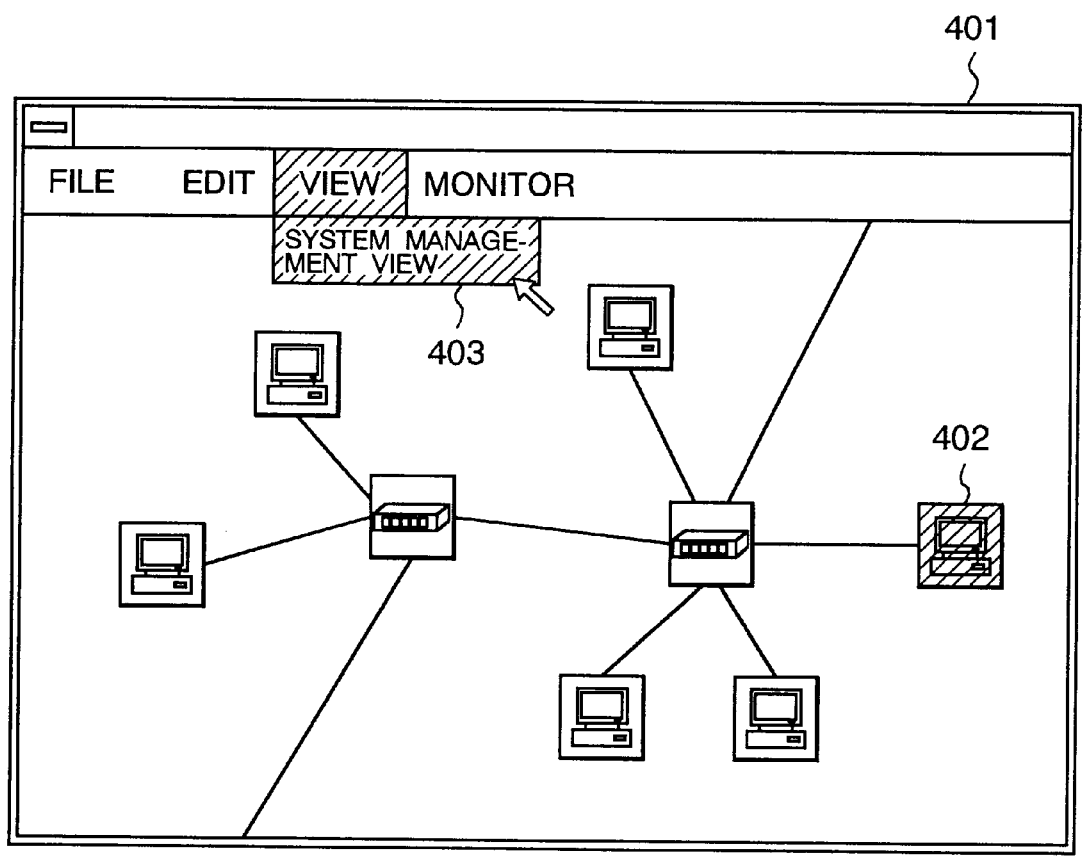
FIG. 4 shows an embodiment of a network management map provided by the network management function.

FIG. 4 shows a network map displayed by the network management module via the output device. A user designates a managed object (402) for displaying the system management configuration by clicking the mouse on the network map (401) shown in FIG. 4. When he selects the menu of System Management View (402) from the window menu on the screen, the relating module is activated.

FIG. 5 is a flow chart showing the outline of the correspondence generating process by the activated relating module.

When the relating module is activated first, the objects correspondence processor is executed. The objects correspondence processor collects the IP address of the managed object first from the network management module based on the display icon designated by the user (501). The objects correspondence processor requests the system management module to search for existence of a node having this IP address (502). If there is a managed object having this IP address, the system management module responds an identifier of the node having the requested IP address. The objects correspondence processor notifies the received identifier to the system management information collection submodule.

Upon receipt of this notification, the system management information collection submodule collects a role of a managed object on the client/server for the designated managed object based on the received identifier (503). The system management information collection submodule collects related information in the respective roles (504).

FIG. 6 is a flow chart showing the outline of the process of collecting relating information when the operated object is a server. The process when the operated object is a server will be explained first. A case that the server is a domain control node for managing the account information of the components in the domain will be considered. In this case, the system management information collection submodule collects the account of the components in the domain and the trust information possessed by the target domain from the system management module (601). The system management information collection submodule obtains a role of every component in domain in the client/server system (602). Furthermore, the system management information collection submodule collects an IP address of the every component in the domain from the system management module and obtains a node having the collected IP address from the network management module. The system management information collection submodule collects an identifier from the obtained node (603). As mentioned above, based on the collected data for each management node, the system management information collection submodule sets the information on the component in the target domain in the correspondence table for the designated managed object as shown in FIG. 7 and stores it in the database (308). As shown in FIG. 7, the correspondence table is an area for storing data of a management node relating to the designated managed object and stores designated object domain configuration information, inter-domain related information, and node information in other related domains. In the area for storing data for the designated managed object, in addition to a domain name (702) including a designated object node (703), as information on a node relating to the designated object, there is a node information table. Rows of the table include the designated object (703), a domain control node (704) managing a domain, an element (705) constituting the domain, correspondence information between configuration information of a node of another domain (712) connected by the peer to peer relation. Columns of the table include a name (706) of each node, a role (707) on the client/server system configuration, and identifiers (708, 709) on the network/system management module. Among these informations, the configuration informations of the designated object node (703), the domain control node (704), and the element constituting the domain (705) can be set by collecting for nodes included in the element constituting the domain managed by the domain control node from the system management module (604). The node of another domain (712) is the component connected at present. Therefore, the system management information collection submodule collects the current connection state of the designated object with another node in the IP address list of the node connected at present from the network management module. These nodes are nodes having an IP address other than the IP address possessed by a node other than the object node in the correspondence table, domain control node, and element constituting the domain (605). The system management information collection submodule collects the configuration information of the node of another domain obtained from the connection state with this designated object from the system management module based on the IP address and the table is completed. In this case, the system management information collection submodule also collects the domain name including this node and stores it in the domain name (713) of a node of another domain in the table. The system management information collection submodule obtains the connection state of the element constituting the domain including the designated object based on the connection state collected from the network management module and stores it in the column of connection state (710) in the correspondence table (606). With respect to the related information (711) among domains, the system management information collection submodule collects and stores a domain having a domain trust relation from the system management module when the designated object node is a domain control node (607).

Next, the process when the operated object is a client will be explained. FIG. 8 is a flow chart showing the outline of the process of information collection when the operated object is a client. In these cases, as the node does not manage account in the domain, the system management information collection submodule collects information of a domain to which client belongs and information of the domain control node controlling the domain (801). In the same way as with a server, the system management information collection submodule checks a remote node connected to the (operated) node from the network management module (802). The system management information collection submodule notifies the IP address to the correspondence processing submodule and receives an identifier of the corresponding node in the system management module (803). The system management information collection submodule generates a correspondence table in the same way as with a server based on the received identifier and the identifier for network management and stores it in the database (308) (804). In the correspondence table generated in this case, there is no related domain (711) and a server stored in the column of related node name is only a node having a role of server in the same domain.

When the aforementioned process ends, the management information collection submodule notifies the end to the display processing submodule.

Upon receipt of the end from the management information collection submodule, the display processing submodule generates a configuration map depending on which is the object, a server or a client (505).

Figure 9:
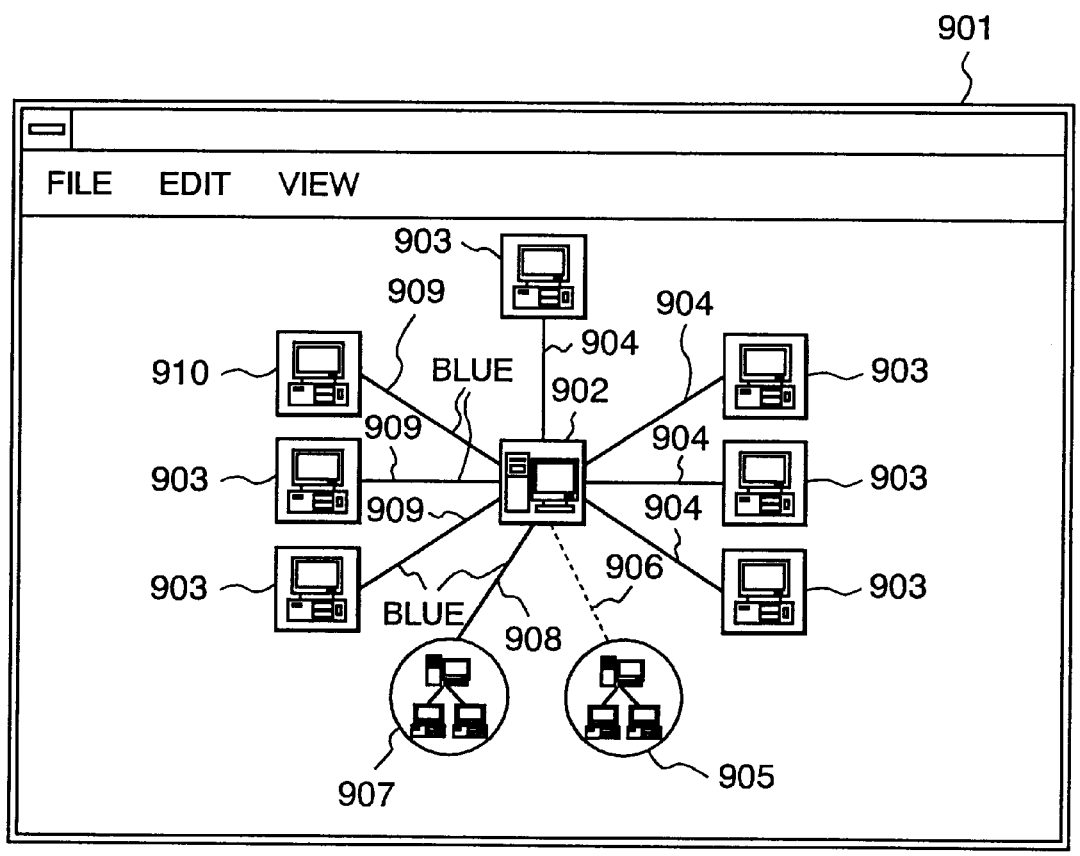
FIG. 9 shows an embodiment of an operation map generated as a result when a managed object having a role of server is designated in the present invention.

Firstly, a server will be explained. In the case of a server, the display processing submodule displays client information and connection information. When it is a domain control node, the display processing submodule also displays information among domains. As a display example in the case of a server, a surveillance map representing configuration information of a domain control node is shown in FIG. 9. In the generating process of a map (901) shown in FIG. 9, a display symbol (902) of the designated object is arranged in the center of the map first. Display symbols (903, 910) of clients in the same domain are generated based on the correspondence table stored in the database and arranged on the display map. The display symbols are connected to the respective clients with lines (904). A domain having a trust relation is obtained from the related domain (711) information in the correspondence table. A display symbol (905) is generated for the domain having a trust relation and arranged on the display map. The designated object is connected to this domain symbol with a dotted line (906). With respect to connection information with a node of another domain connected by the peer to peer relation, a domain symbol (907) for a domain including the node is generated and the designated object is connected to the domain symbol with a straight line (908). This domain symbol generates a low-hierarchical map and arranges a symbol other than the domain which is actually connected to the designated object node in it. Lastly, a symbol of the corresponding node in the connection state at present is obtained from the current connection relation and the connection line is colored blue (908, 909).

Figure 10:
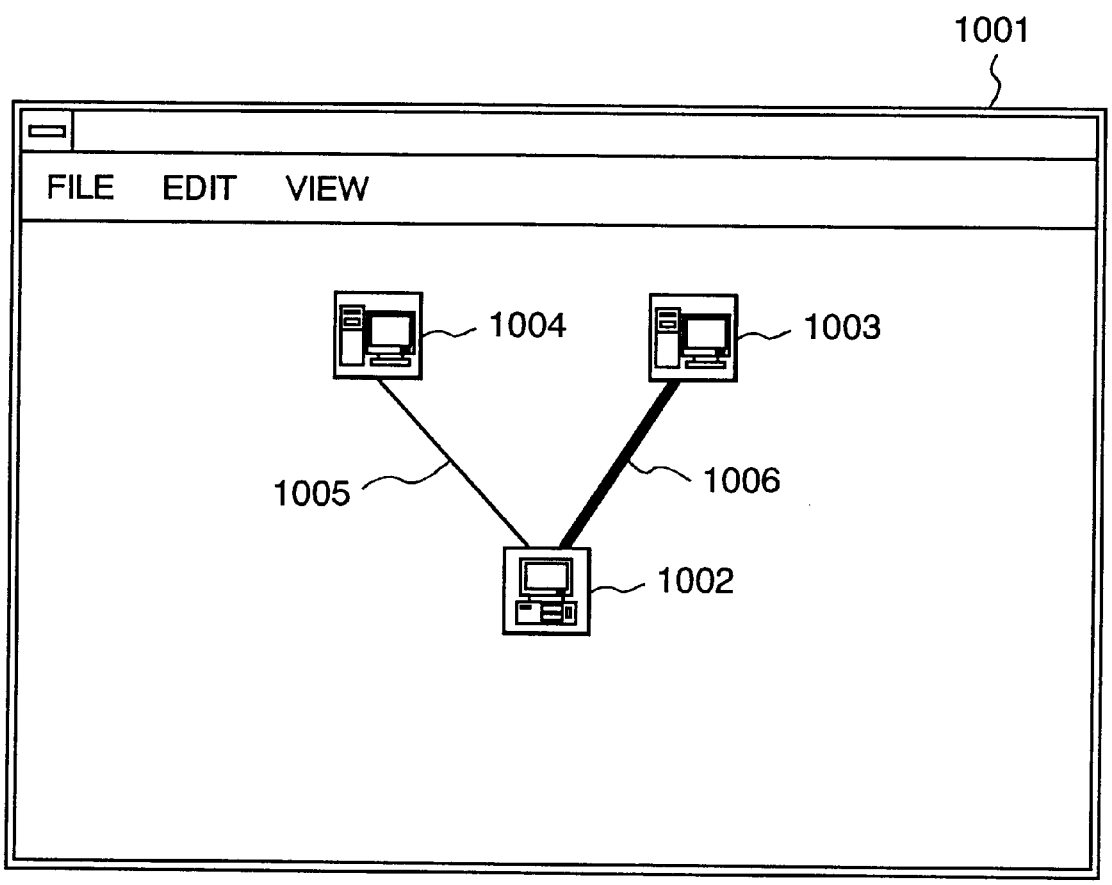
FIG. 10 shows an embodiment of an operation map generated as a result when a managed object having a role of client is designated in the present invention.

Next, the case of a client will be explained. In this case, the display map displays a server and a node which is in the peer to peer relation connected at present. In the case of a client, as shown in FIG. 10, a display symbol (1002) for the designated node is arranged in the center first. The connections of the display symbol to the servers (1003, 1004) in the connection state at present are displayed. In this process, the servers connected at present are obtained by the connection table in the database and the display symbols are arranged on the display map. With respect to the connection line (1006) with a domain control node, the connection with the domain control node is represented by widening the connection line. Those symbols are connected to the clients with lines (1005).

By the aforementioned process, the node which is concerned at present can be displayed in a node designated from the display symbol on the network map based on the client/server configuration and the current operation state can be displayed easily.

Figure 11:
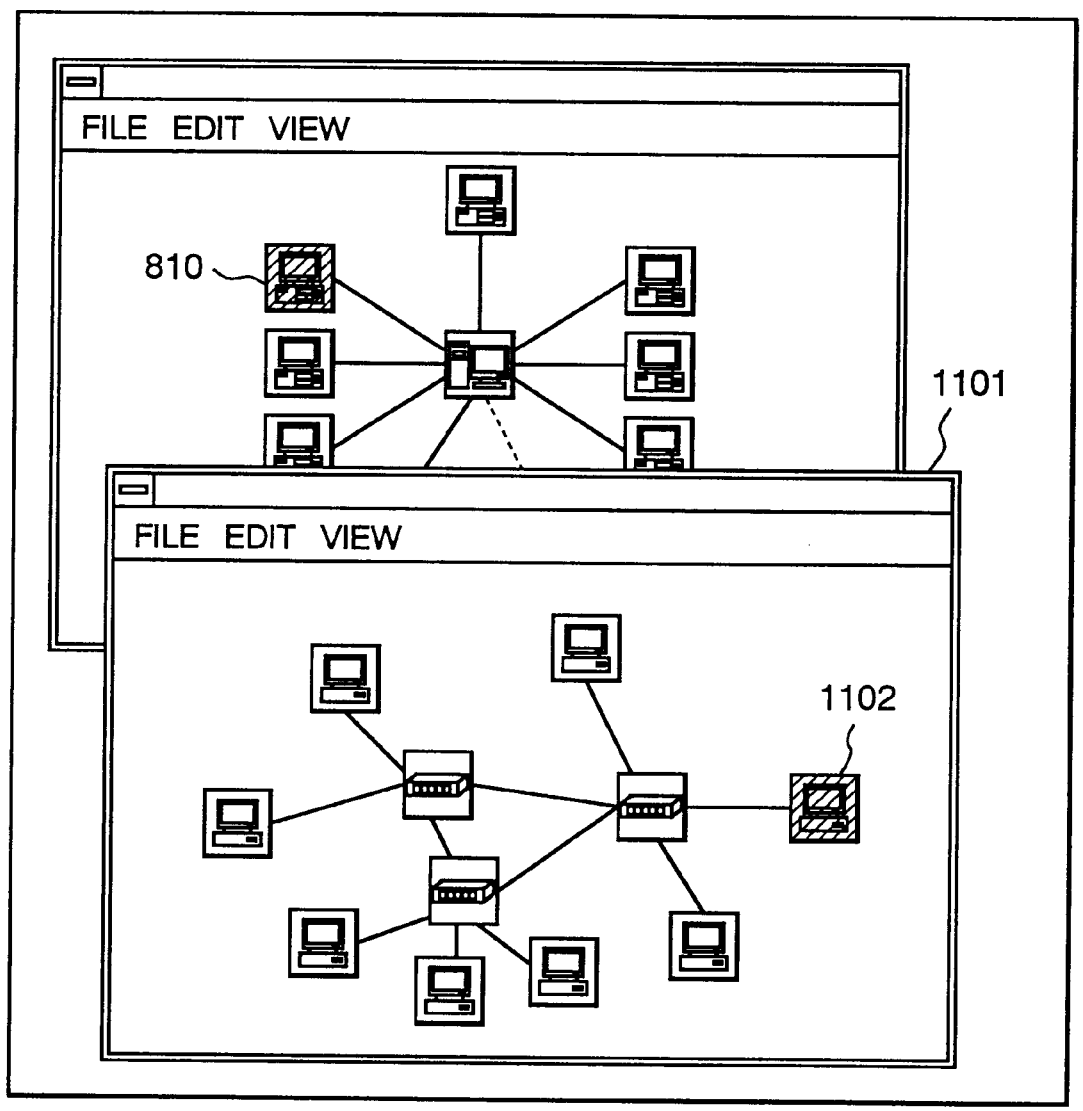
FIG. 11 shows an embodiment of a monitor screen showing a network map including a corresponding display symbol displayed when a symbol on an operation map generated in the present invention is designated.

Next, the correspondence between the generated surveillance map and the network map, and the management information display method will be explained. One (810) of the symbols of the surveillance map generated by the aforementioned process is designated and the process of the display correspondence processing submodule is executed by menu selection. The display correspondence processing submodule collects an identifier for network management from the correspondence table existing in the database. The display correspondence processing submodule requests a network map including the corresponding node to the network management module based on the collected identifier. When the requested network map is received, the display correspondence processing submodule allows the output device to display the network map. As a result, as shown in FIG. 11, a network map (1101) including the designated managed object is displayed and among the displayed symbols, the display symbol (1102) of the designated managed object on the network map is highlighted.

From the aforementioned, the location on the network map wherein the related node displayed in the client/server configuration is positioned can be recognized easily and the connection relation with the operated object on the network can be known easily.

Embodiment 2

As a second embodiment, a method of relating and displaying static configuration information of the client/server configuration based on a managed object to be monitored on a network management map will be explained hereunder by referring to FIGS. 11 to 20.

Figure 12:
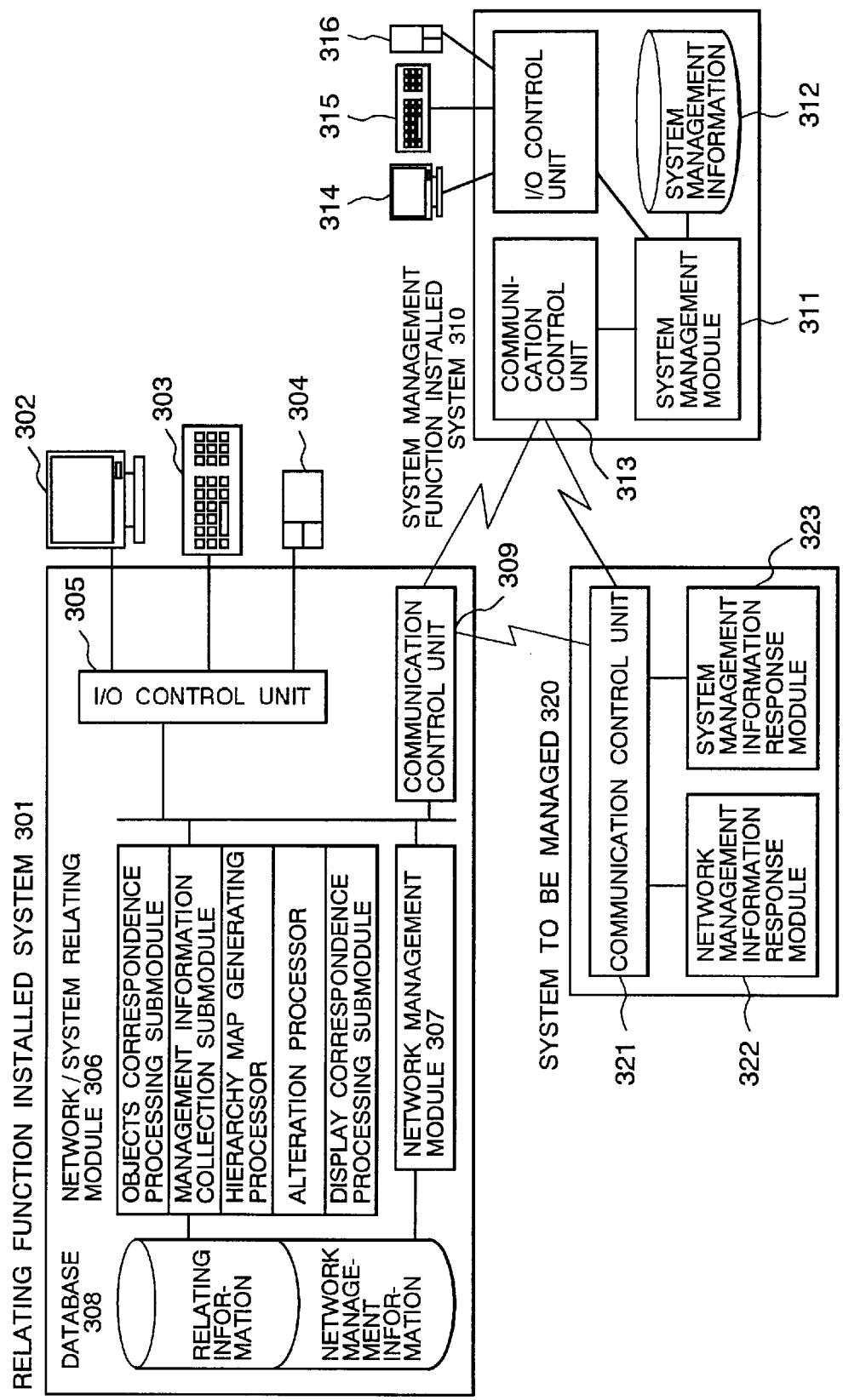
FIG. 12 is a block diagram of the system configuration when an administrative map is generated beforehand in the present invention.

FIG. 12 shows the configuration of a system in which a network/system relating module using this function is installed. This system configuration is similar to the relating function system configuration shown in the first embodiment but different in addition of a hierarchy map generating processor and a change processor in the process in the network/system management relating module 306.

Figure 13:
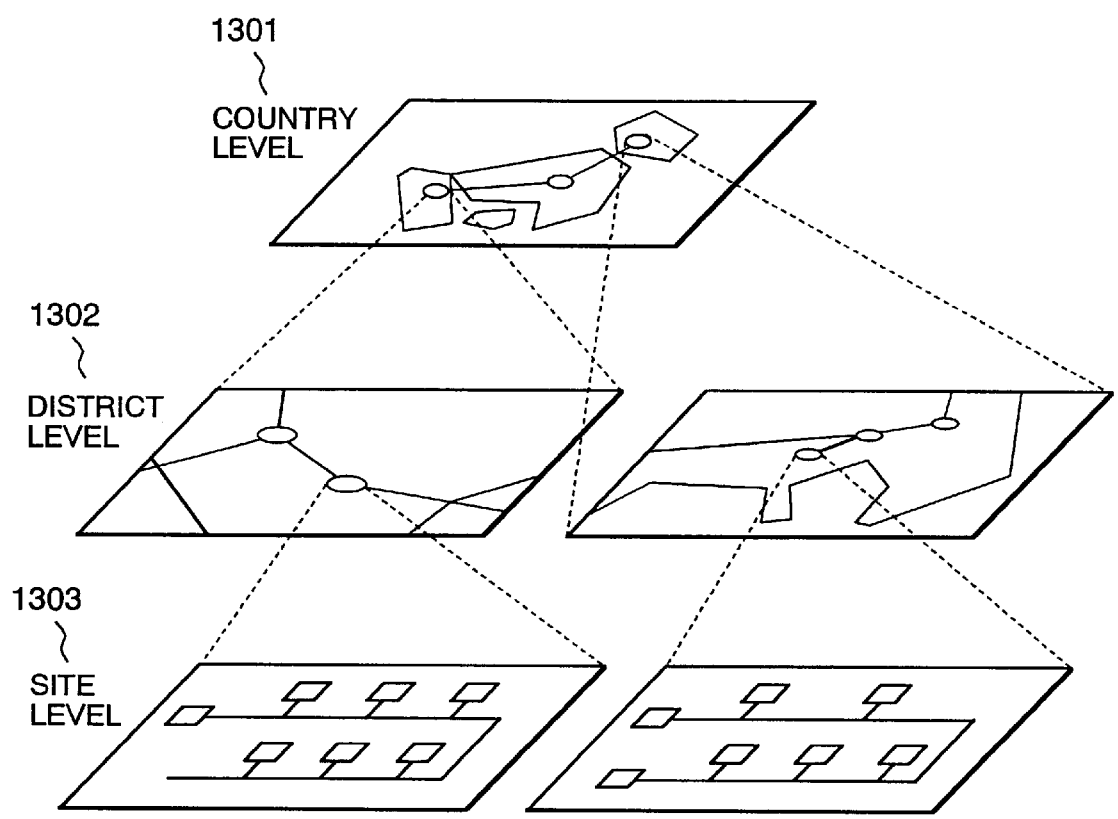
FIG. 13 shows a form of a network map provided by the network management function.
Figure 14:
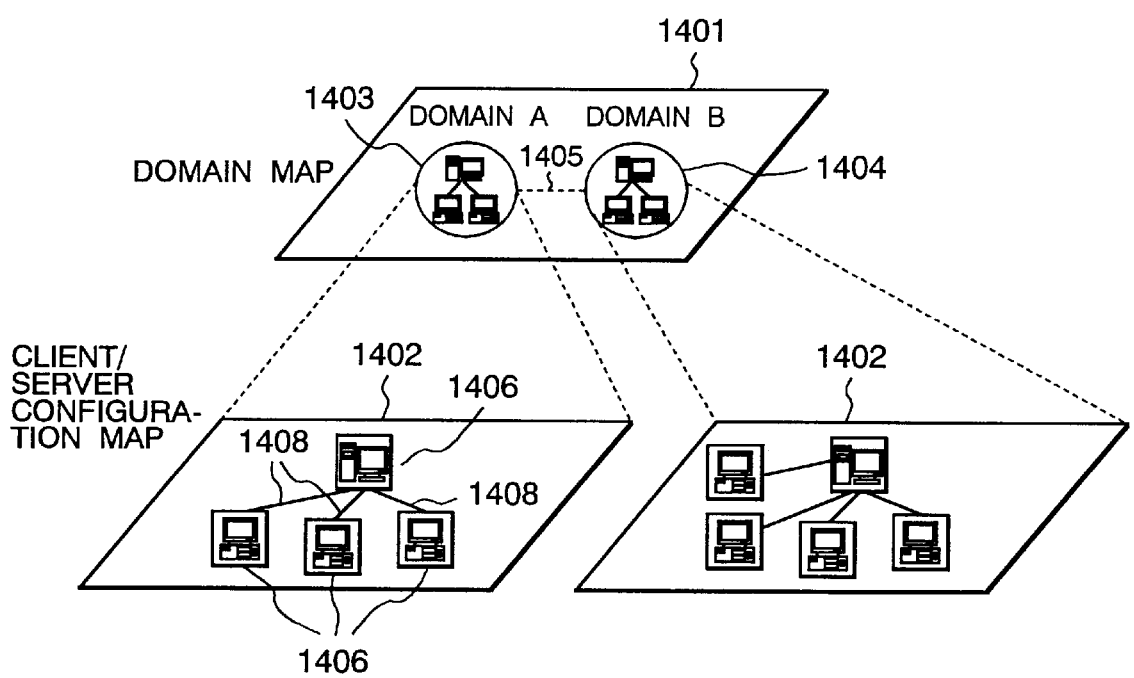
FIG. 14 is a drawing showing a map provided as an administrative map and the hierarchical structure of the map.

Next, a process of creating a client/server configuration based on the surveillance map of the network will be explained by referring to FIGS. 12 to 20. With respect to a network map, as shown in FIG. 13, a network spreading in a geographical range is shown as a network map of a country level (1301) or a hierarchy map such as a district network map (1302) or a hierarchy network map on the basis of an IP address is displayed. On the other hand, with respect to the relation of each object node in the system management, there is a case that a system is configured in the client/server configuration in units of node and the components thereof are related to each other. For example, in Windows NT (Windows NT is a trademark of Microsoft Corporation in USA) of Microsoft, Ltd., nodes constituting clients/servers are configured as a domain separately from the network configuration in use. The account of these domains is managed by a domain control server. The domains have a relation that the account extending over the domains is managed. Therefore, unlike a network map as shown in FIG. 14, the client/server configuration is a hierarchical map configuration of a domain map (1401) showing the account relation among the domains and a map (1402) showing the client/server configuration in each domain. In each client/server configuration map, the relation on account management is shown by connection lines. For example, a connection line (1405) between a domain A (1403) and a domain B (1404) shown in FIG. 14 indicates that the account is shared and in the client/server configuration map (1402) shown in FIG. 14, the relation is represented by a connection line (1408) between a server (1406) managing the account and a client (1407).

To relate these configuration maps to a network management map and display them graphically, it is necessary to generate these hierarchical maps first. To generate hierarchical maps, there are two kinds of phases such as a client/server configuration initial generation phase for generating a client/server configuration first and a client/server configuration change phase when the domain configuration is changed in use after generation. Firstly, the initial generation phase of client/server information on the network management system will be explained.

Figure 15:
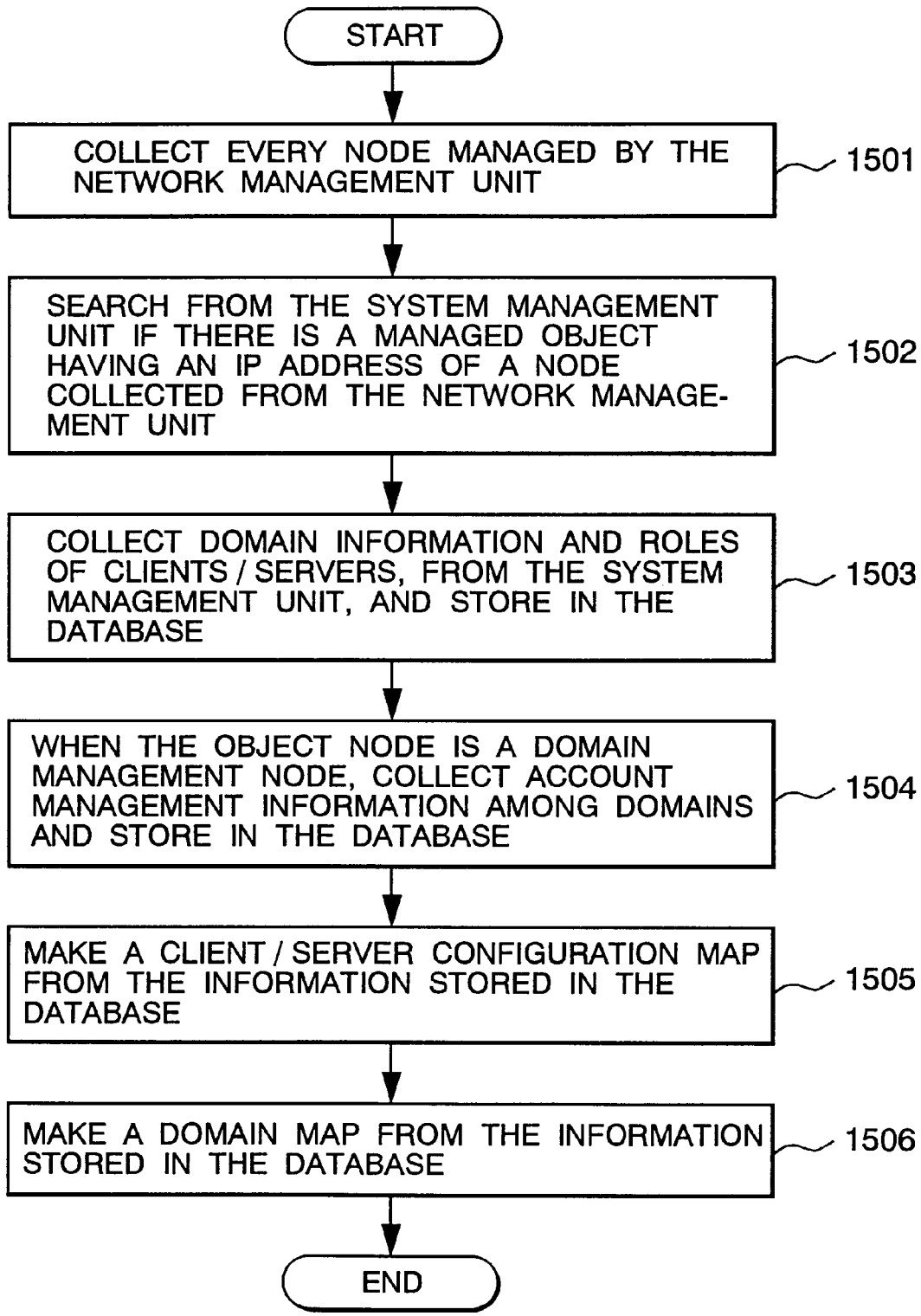
FIG. 15 is a flow chart the outline of a process when an administrative map is generated beforehand in the present invention.

FIG. 15 shows the outline of the flow of the surveillance map automatic generating process of the client/server configuration in the initial generation phase. Firstly, the hierarchy map generating processor collects identifiers of all nodes managed by the network management module at present from the network surveillance map database (1501). Next, the hierarchy map generating processor collects an IP address of a corresponding node from the network management information for the collected nodes and inquires as to whether there is a managed object having this IP address from the system management module (1502). The system management module (311) searches for IP address information from the network information in the system management information (312). If there is IP address information, the system management module (311) notifies the existence thereof. Upon receipt of the identifier of the node having the requested IP address, the management information collection submodule collects domain information for the object node from the system management module (311) via the communication control unit (309, 313) based on the notified identifier. The management information collection submodule collects all node names and system roles in the same way (1503). The management information collection submodule reserves the collected data in a correspondence table (1601) showing the correspondence relation of each management node as shown in FIG. 16. This table stores a domain name (1604), a role in the client/server (1605), an identifier for network management (1606), and an identifier for system management (1607) for each management node (1603) in addition to a table identifier (1602). When the object node is a domain control node, the management information collection submodule collects domain information sharing account information (1404). This account information is stored in a domain information table (1701) as shown in FIG. 17. This table stores information in units of domain and a domain name (1703), a domain control node (1704) for managing the domain, and a related domain list (1705) showing the relation of account management among the domains are stored in the table in addition to a table identifier (1702).

When related information is stored in the database (308) in which all informations are collected, the hierarchy map generating processor generates a client/server configuration map next according to each domain information from the correspondence table stored in the database (1505). In the client/server system, unlike network management, there are a node having a role of server and a node having a role of client and a role of server for managing the domain, though these nodes are the same as a device. Therefore, as shown in FIG. 13, with respect to a display symbol on the client/server configuration map, the hierarchy map generating processor generates a server symbol (1406) for a node having a role of server which can represent each role and a client symbol (1407) for a node having a role of client. The hierarchy map generating processor generates symbols (1403, 1404) for displaying the map on the map that display the information among the domains. Next, the hierarchy map generating processor displays the information among the domains as a connection line (1405) of the symbols among the domains (1506). By doing this, information among the domains and the server/client configuration in the domains can be obtained from the management information of the network management.

Next, the change phase when the client/server configuration is changed for the display symbol information generated by the aforementioned means will be explained by referring to FIGS. 12 and 18 to 20. The change processor is activated by one of periodic polling to the network management module, periodic polling to the system management module, reconstruction by a command from a user, and notification showing addition of a node from each management module. Change contents are a case that a new node is generated, a case that the role possessed by each node is changed, a case that the domain to which the object node belongs is changed, and a case that the account management among the domains is changed.

Firstly, the process when a new node is added will be explained. A case that an addition notification is given from the network management module will be explained hereunder. Upon receipt of an addition notification from the network management module, the change processor collects an IP address from the identifier. Hereafter, in the same way as with the map generating process of the initial generating process, the change processor obtains an identifier of the system management module from the IP address, obtains the correspondence relation, collects domain information, a domain control node, and a role based on the identifier, and arranges display symbols on the client/server configuration map corresponding to it. If there is no corresponding domain, the change processor generates a domain symbol on the domain map as a new domain and generates a domain.

Figure 18:
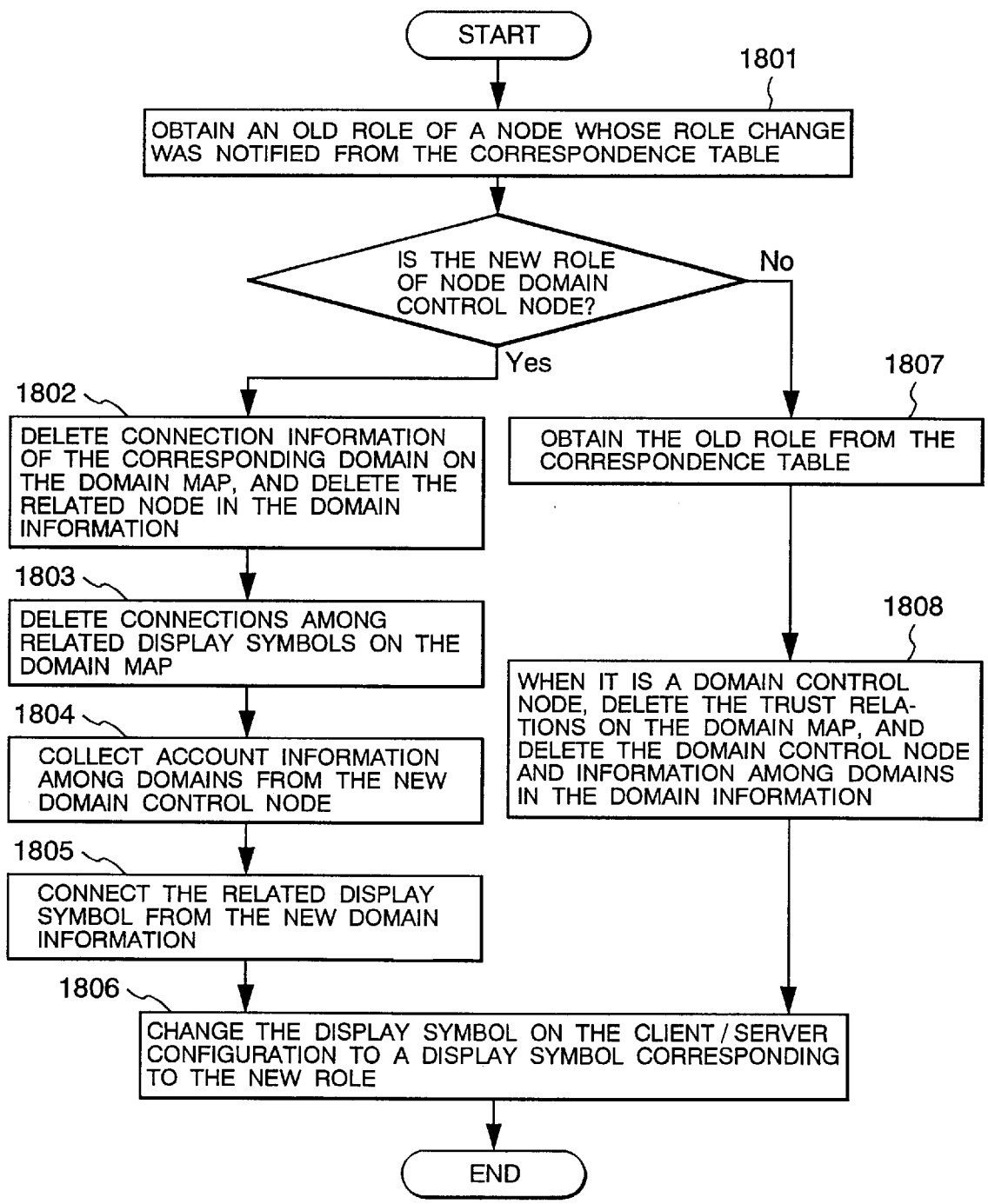
FIG. 18 is a flow chart showing the outline of a process of reflecting a change in the role of client/server, if any, after an administration map is generated beforehand to the map.

Next, the change process when the role is changed in the client/server configuration will be explained. FIG. 18 shows the outline of the change process when the role is changed. When a role changing notification from a node in which the role is changed is received from the system management module, the data is transferred to the change processor. The change processor collects role information for the node whose role change is notified (1801).

If the role is changed to a domain control node, the change processor collects whether there is an existing domain control node from the domain information. If there is a domain control node, the change processor extracts related information among the domains from the account information of the domain information (1802). The change processor deletes the information among the domains and deletes the connection information among the symbols relating to the information (1803). Furthermore, the change processor collects account information on the domain control node and sets information among the domains from the collected information (1804). The change processor generates the result as a connection line between each domain symbol (1805). Lastly, the change processor changes the display symbol to a symbol corresponding to the changed role (1806).

When the role is a client, the change processor obtains the old role of the changed node from the correspondence table (1807). When the old role is a domain control node, the change processor deletes the trust relations on the domain map and also deletes the domain control node in the domain information (1808). When a server other than the domain control node is changed, the change processor only changes the display symbol of the node.

Figure 19:
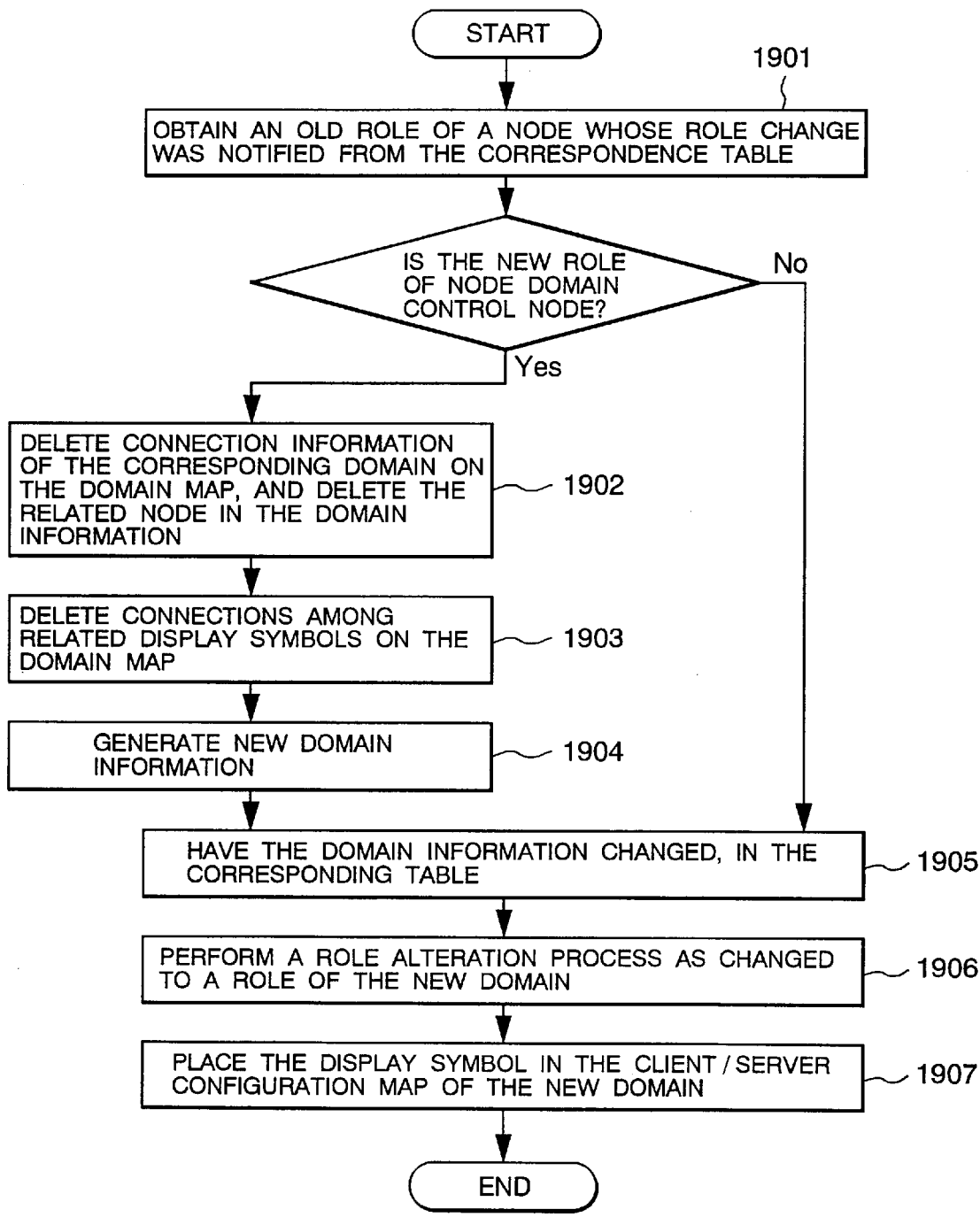
FIG. 19 is a flow chart showing the outline of a process of reflecting a change in the domain, if any, after an administration map is generated beforehand to the map.

Thirdly, the change process when the domain is changed will be explained. FIG. 19 is a flow chart showing the outline of the change process when the domain is changed. When a change of the domain is received, the domain change process searches for the old role of the changed node (1901). When the old role is a domain control node, the domain change process collects information among the domains from the account information of the domain information first and deletes the relation among the domains (1902). The domain change process searches for domain control node information of the domain information. When it is a domain symbol of change notification, the domain change process deletes the information (1903). Hereafter, in the same way as with a case that the role is changed, the domain change process obtains a management system having system management information. The domain change process generates new domain information for the node (1904). Hereafter, the domain change process changes the domain name in the correspondence table to a new domain (1905). Furthermore, the domain change process considers that a domain role is newly given and performs the same process as that of the domain information collection during role change (1906). Lastly, the domain change process arranges a change display icon on the corresponding domain map (1907). If there is no domain to be changed at this time, the domain change process newly generates domain information and a domain symbol.

Figure 20:
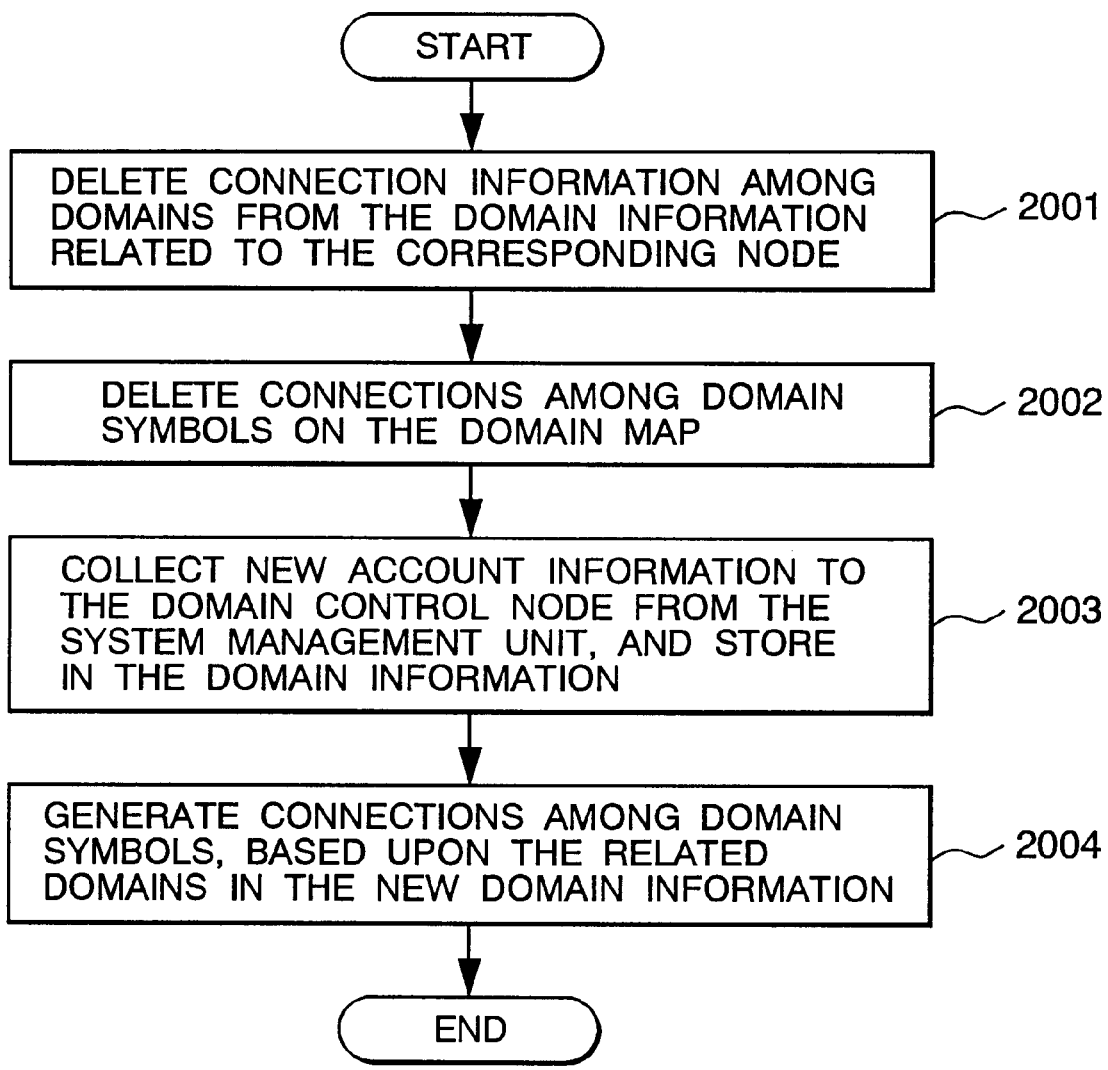
FIG. 20 is a flow chart showing the outline of a process of reflecting a change in the account relation among the domains, if any, after an operation map is generated beforehand to the map.

The change process when the account information among domains is changed will be explained lastly. FIG. 20 is a flow chart showing an outline of process when account information to a node is changed. Account information among domains is notified from the domain control node in the domain to the system management module and the system management module notifies it to the relating module. Upon receipt of this information, the relating module obtains the security information from the domain information and deletes the account information of the old domain (2001). Then, the relating module deletes the account information on the domain map (2002). Next, the relating module obtains a management system for managing management information of the corresponding PC, collects account information from the management system, and collects account information among new domains. The relating module generates account information among the domains based on this collected account information (2003). Lastly, the relating module generates connections among the domain symbols on the domain map (2004).

By doing this, by relating to a managed object to be monitored on the network map, static configuration information of the client/server configuration can be generated.

In this generating process, a display symbol on the network surveillance map can be related to a display symbol on the client/server configuration map based on an identifier on each management module from the correspondence table shown in FIG. 16. Therefore, for example, even if the network map and the generated client/server configuration map are the same menu, this module can perform the translating process of the identifiers of the management systems of the two and use the modules of the two in common.

For these display symbols, network management corresponding node identifiers are set from the correspondence table shown in FIG. 16. Therefore, as shown in FIG. 11, when a correspondence request is issued, a node identifier on the network map can be collected from the correspondence table and the network map including a display symbol for the node can be displayed.

Embodiment 3

As a third embodiment, a case that configuration information necessary for a management node is collected directly from the network management system will be explained.

The configuration of this embodiment is similar to the configuration explained in the second embodiment but different in a point that the agent side notifies to the network/system management module.

Figure 21:
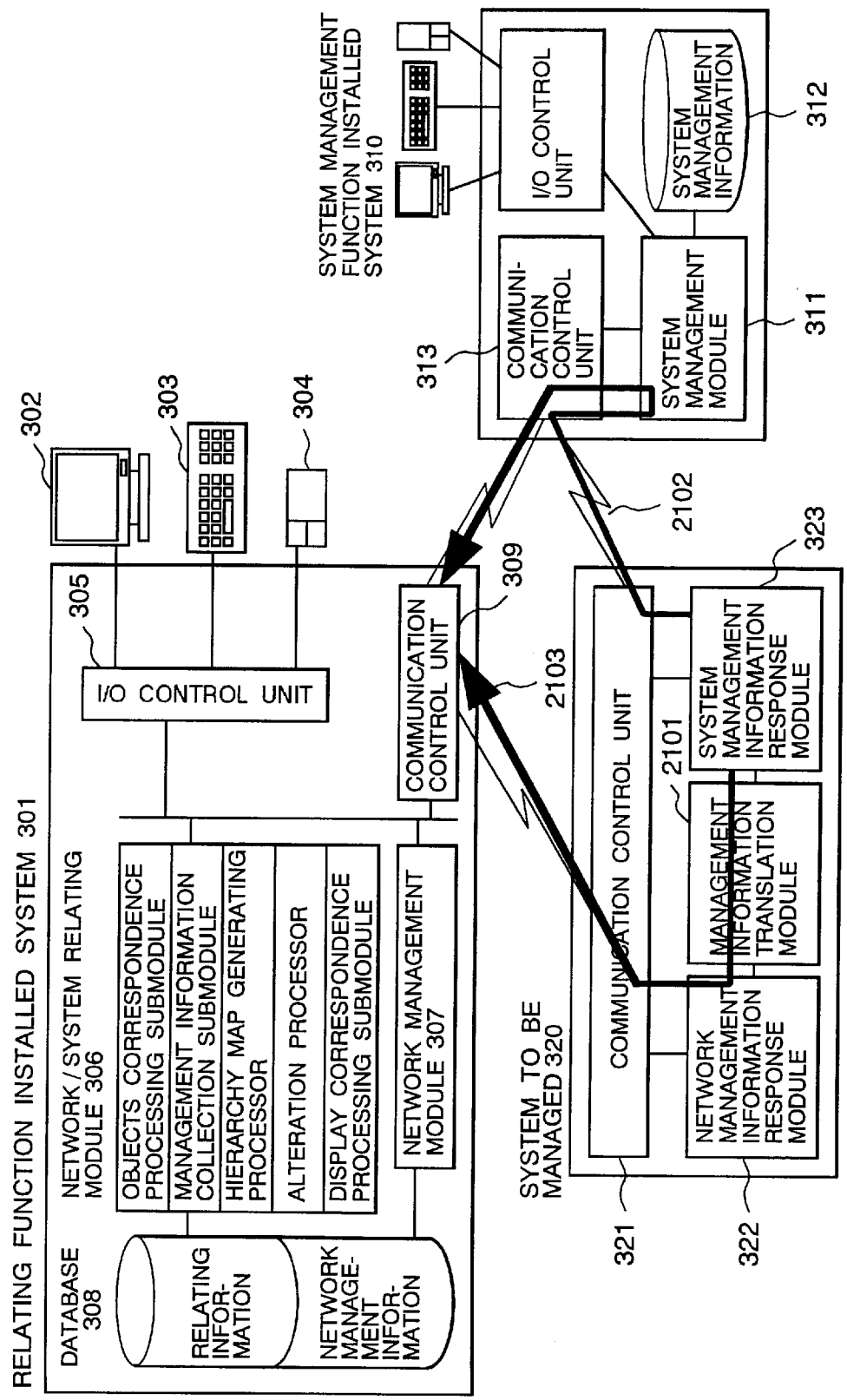
FIG. 21 is a block diagram showing the system configuration and the flow of management information when information is collected directly from the managed object during management information collection in the present invention.

Next, the processing content based on this embodiment will be explained by referring to FIG. 21.

In the generating process of a client/server configuration map, there are an initial generation phase and a change phase in the same way as with the second embodiment. FIG. 21 shows the configuration of this embodiment and the management information collection path during generation of a client/server configuration map. The configuration is the same as that of the second embodiment but different in that a management information translation module (2101) is added to the agent side. Management information in the processes of the above two phases are obtained for the system management module in the second embodiment (2102). However, in this embodiment, information can be collected directly via the network management module (2103), by the above additional module. Therefore, the client/server configuration generating process is only different in the collection destination of management information from that of the second embodiment but the same in the processing content.

By doing this, a client/server configuration can be generated by a single collection means, so that even if there is no system management module, the client/server configuration can be displayed and the correspondence with the network map can be kept from the relationship between a display symbol in the database and a network management identifier.

According to the present invention, the administrative form of each system which is represented individually so far can be seen visually and the administrative configuration state can be easily checked visually. Therefore, when a fault occurs in a server, it can be easily judged which client will be affected by it.

Furthermore, since a display element on the network map and a display element on the administrative configuration map can be related to each other by relating a managed object in network management to a managed object in system management, the same managed object can be known easily, even if the same managed object is displayed in a different view.

The invention claimed is:

1. A system management/network management correspondence display method in a management system using a network management module managing network resource information including network configuration, and a system management module managing system resource information including a client/server configuration of a computer network including a plurality of computers, comprising:

displaying a network management map for managing said computer network, or a client/server configuration map for managing said system;

designating a managed object on said network management map or on said client/server configuration map;

collecting an identifier of said managed object in a first module in said network management module and said system management module, based upon the management information which is managed by a second module in common with said first module, using said network management map or said system map;

displaying said client/server configuration to which said managed object relates with at least one display symbol, when said second module is a client/server configuration module; and, displaying said network configuration to which said managed object relates with at least one display symbol, when said second module is a network configuration module.

2. A system management/network management correspondence display method according to claim 1, wherein said step of displaying said client/server configuration, or said step of displaying said network configuration visually displays said client/server configuration or said network configuration to which the designated managed object relates, by a display symbol and a connection among display symbols.

3. A system management/network management correspondence display method according to claim 1, further comprising:

collecting information on a management node connected to the designated managed object at a certain time;

obtaining a node of at least one of a server and a client in a connection state at said certain time; and displaying a connection between a corresponding node in said client/server configuration map including said client/server configuration and the designated node by a symbol for distinguishing it from a connection between nodes not in the connection state.

4. A system management/network management correspondence display method in a management system using a network management module managing network resource information including network configuration, and a system management module managing system resource information including a client/server configuration, of a computer network including a plurality of computers, comprising:

obtaining managed nodes within the scope of management made by said network management module;

collecting client/server configuration information for each node within said scope of management, from said system management module;

generating client/server configuration maps each corresponding to a collected client/server configuration comprising all nodes within said scope of management;

obtaining correspondence among at least a display symbol of said client/server configuration map and at least a display symbol of the network management map.

5. A system management/network management correspondence display method according to claim 4, further comprising:

displaying at least one of the generated client/server configuration maps.

6. A system management/network management correspondence display method according to claim 4, wherein said step of generating said client/server configuration maps comprises:

generating an hierarchy map representing the relation among domains in which said client/server configuration is a component; and displaying said client/server configuration map, independently of said network management map.

7. A system management/network management correspondence display method according to claim 4, further comprising:

allowing display elements of said client/server configuration maps to have identifiers in said network management module respectively;

designating a display element of said configuration map;

extracting a client/server configuration map including said designated display element in said network management map by an identifier in the network management module of the designated display element; and knowing the position of the configuration for network management for the automatically relating component from the designated display element.

8. A system management/network management correspondence display method according to claim 4, further comprising:

designating a display symbol displayed on at least one of said client/server configuration map; and displaying said network management map including a display symbol corresponding to the designated display symbol from the obtained correspondence among said display symbols.

9. A system management/network management correspondence display method according to claim 4, further comprising:

storing an identifier in the network management module obtained during generation of said client/server configuration maps;

designating a display element in the generated client/server configuration maps;

extracting a client/server configuration map including the designated display element in said network management map displayed for network management, based upon said identifier in the network management module of said designated display element;

displaying the extracted display element; and knowing the position of the configuration for network management for the automatically relating component on the basis of said display.

10. A system management/network management correspondence display method according to claim 4, further comprising:

a step of monitoring a change in management information in said network management map when a node in said network is added and obtaining a managed node newly added in said network;

a step of collecting client/server configuration information of a corresponding managed node for the client/server configuration management module from the IP address of said management node; and a step of automatically changing said client/server configuration map in correspondence to a change in said network management map.

11. A system management/network management correspondence display system using a network management module managing network resource information including network configuration, and a system management module managing system resource information client/server configuration, of a computer network including computers, comprising:

means for displaying a network management map for managing said computer network, or a client/server configuration map for managing said system;

means for designating a managed object on said network management map or on said client/server configuration map;

means for collecting an identifier of said managed object in a first module in said network management module and said system management module, based upon the management information which is managed by a second module in common with said first module, using said network management map or said client/server configuration map;

means for displaying said client/server configuration to which said managed object relates by at least one display symbol, when said second module is a client/server configuration module; and means for displaying said network configuration to which said managed object relates by at least one display symbol, when said second module is a network configuration module.

12. A system management/network management correspondence display system using a network management module managing network resource information including network configuration, and a system management module managing system resource information including client/server configuration, of a computer network including a plurality of computers, comprising:

means for obtaining managed nodes within the scope of management made by said network management module;

means for collecting client/server configuration information for each node within said scope of management, from said system management module;

means for generating client/server configuration maps each corresponding to a collected client/server configuration comprising all nodes within said scope of management;

means for obtaining correspondence among at least a display symbol of said client/server configuration map and at least a display symbol of a network management map including said network configuration.

* * * * *